United States Patent [19]

Veilleux

[11] Patent Number: 5,112,163
[45] Date of Patent: May 12, 1992

[54] VARIABLE TOOL BIT HOLDER

[76] Inventor: Thomas Veilleux, 22 Perry Ave., Lawrence, Mass. 01841

[21] Appl. No.: 763,356

[22] Filed: Sep. 20, 1991

[51] Int. Cl.$^5$ .............................................. B23P 15/28
[52] U.S. Cl. ................................... 407/101; 407/102; 82/158
[58] Field of Search ................. 82/158, 159, 160, 161; 407/77, 79, 88, 89, 101, 117, 102

[56] References Cited

U.S. PATENT DOCUMENTS

| | | | |
|---|---|---|---|
| 3,758,927 | 9/1973 | Stein | 407/101 |
| 3,780,408 | 12/1973 | McCreery | 407/88 X |
| 3,825,981 | 7/1974 | Cochran et al. | 407/101 |
| 4,077,735 | 3/1978 | Dick et al. | 407/89 |
| 4,137,000 | 1/1979 | Takacs et al. | 407/101 |
| 4,247,231 | 1/1981 | Kraemer | 82/158 X |
| 4,332,513 | 6/1982 | Gowanlock | 407/101 |
| 4,730,525 | 3/1988 | Kelm | 82/159 |

Primary Examiner—Larry I. Schwartz
Assistant Examiner—J. R. Daulton
Attorney, Agent, or Firm—Edward A. Gordon

[57] ABSTRACT

A variable tool bit holder which takes the place of up to eight standard tool bit holders for machining a workpiece including a shank member having a generally elongated rectangular configuration, and a groove positioned on an end portion of the shank member and comprises an end groove portion extending across an end surface of the shank member and side groove portions extending horizontally on the left and right side surfaces of the shank member toward the opposing end surface for a distance at least equal to the end surface groove portion; a support blade having top and bottom surfaces each defined by a frontally disposed V-shaped bit-receiving forward edge portion and a rearwardly disposed planer top surface disposed above the plane of the bit-receiving surface; a transversely projecting elongated rib extending longitudinally along the inner side of the support blade and adapted to be inserted in a selected groove portion and releasably secured thereto; an insert bit having opposing cutting tips and a V-shaped bottom edge adapted to be received in the V-shaped bit-receiving portion of the support blade; and a clamp which is releasably attachable to a portion of the surface of the shank member adjacent to the top surfaces of the bit and support blade whereby a portion of the clamp clamps the bit member between the support blade and the clamp and the top surface of the support blade.

9 Claims, 4 Drawing Sheets

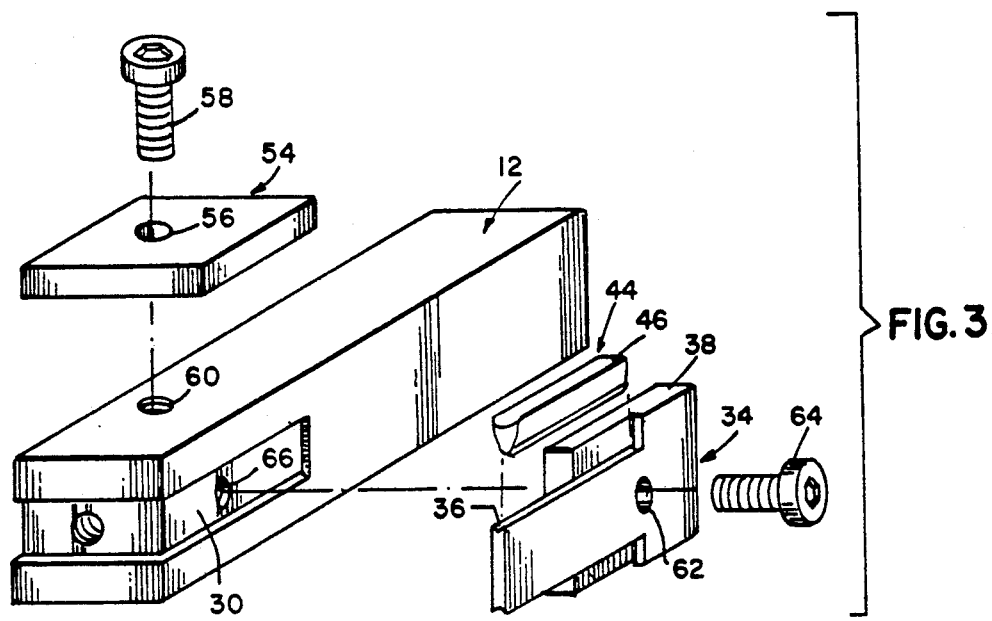
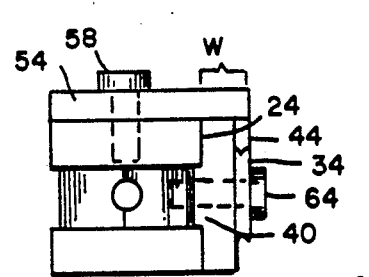
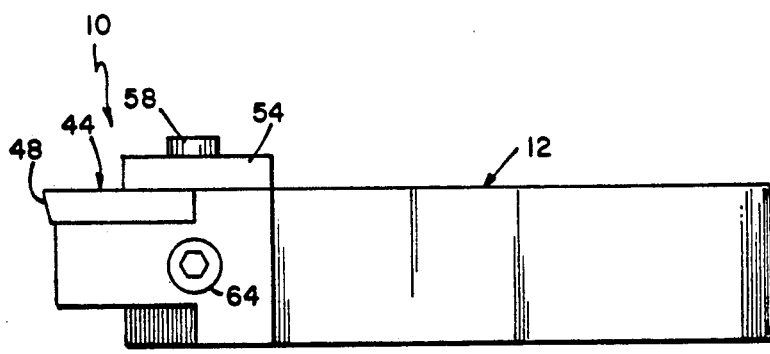
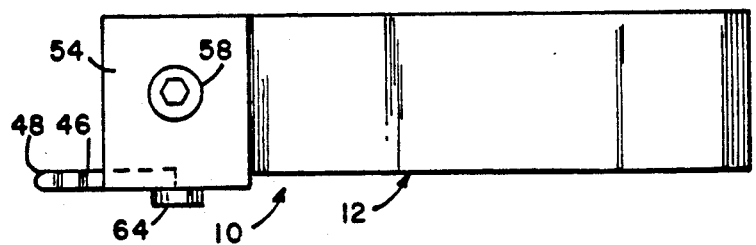

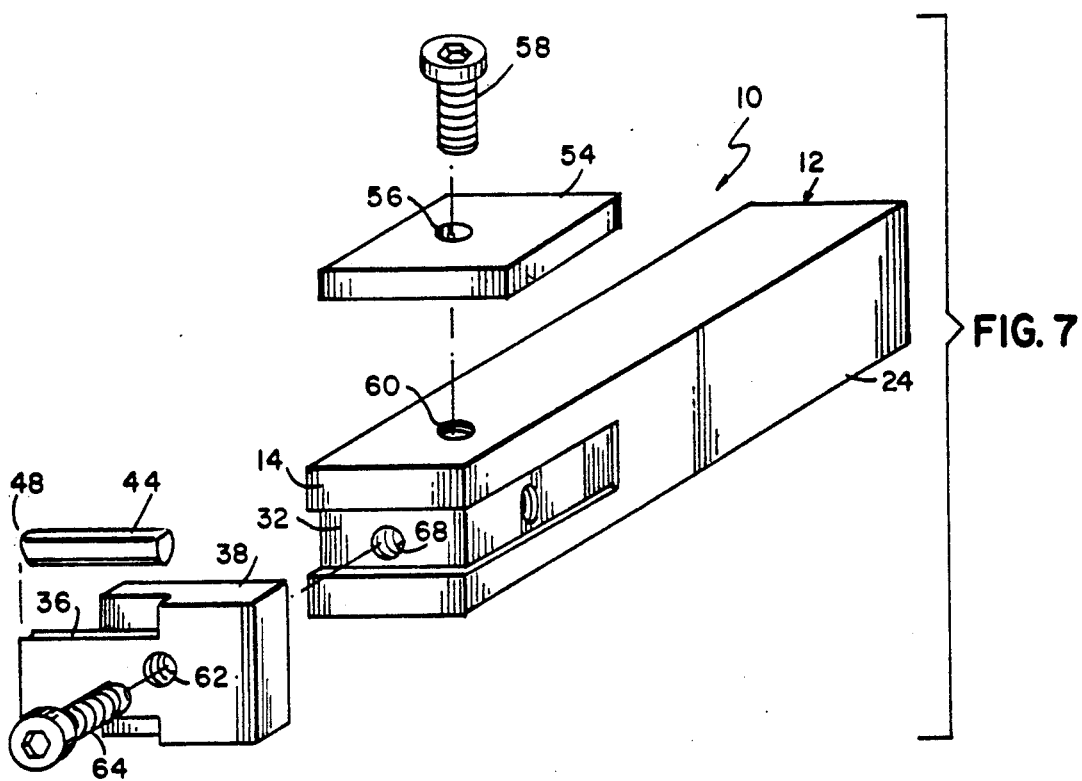
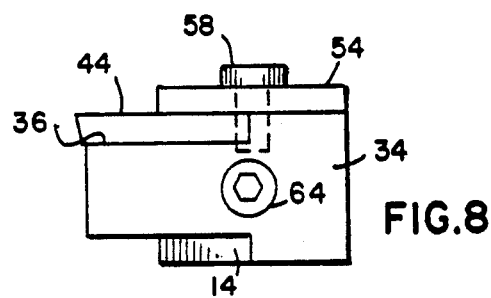
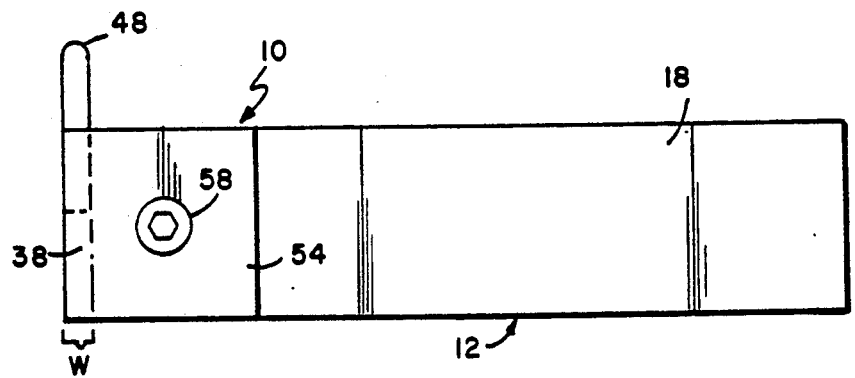

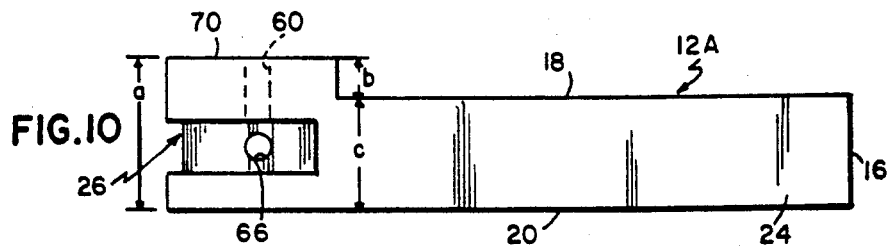
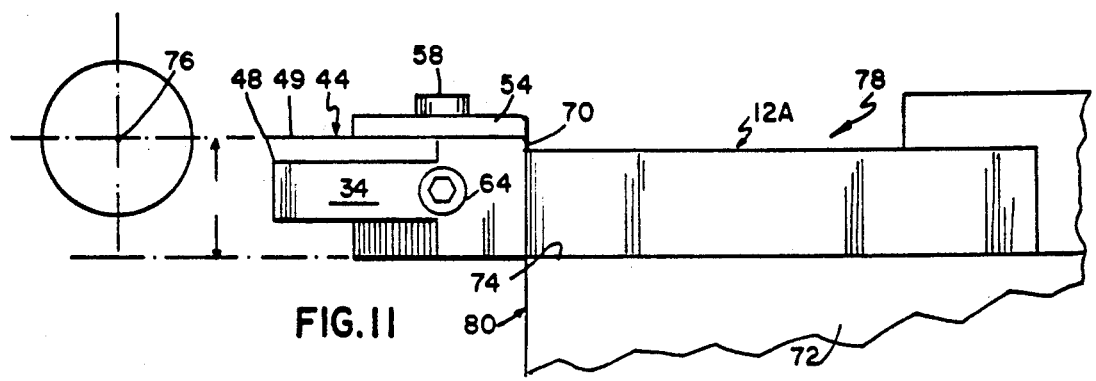
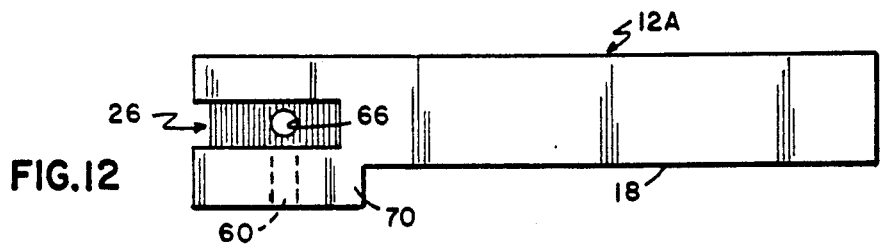
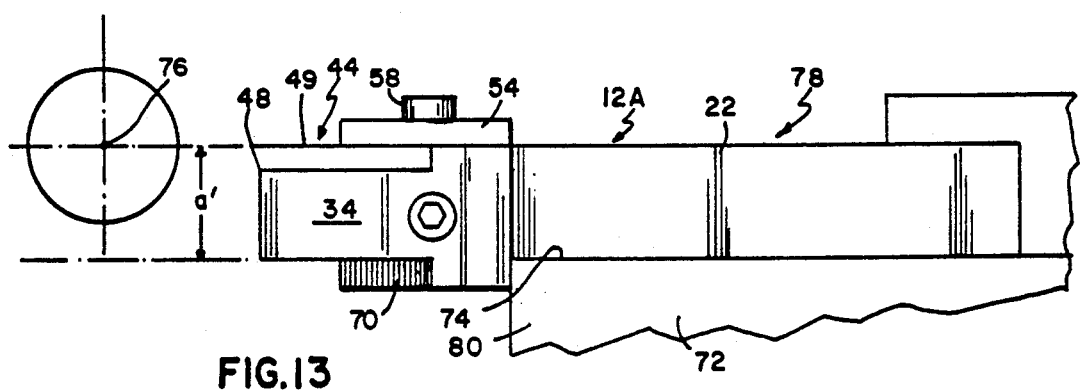

VARIABLE TOOL BIT HOLDER

BACKGROUND OF THE INVENTION

1. Field of the Invention

The present invention relates generally to machine tools and more particularly to improvements in a tool bit and tool holder assembly which provides for a plurality of tool bit cutting positions while the tool bit holder is rotatably mounted in conventional commercially available machines such as a lathe.

2. Description of the Prior Art

This invention relates to the art of metal cutoff and particularly that type of metal cutoff wherein a rigid cutoff tool is advanced into the periphery of a rotating workpiece so as either to effectuate cutoff of a portion of the workpiece or to place a groove in the same as required.

With respect to the prior art holder, when a workpiece is to be treated in various locations or positions by the tool bit blade to perform the operation of shaping, facing, chamfering and the like, from different directions from the holder such as straight right or straight left and end right or end left the tool holder and insert must be replaced in the lathe machine with a separate tool holder and the respective insert for each position.

Another disadvantage of the prior art tool bit holder is that separate and individual tool holders must be used to provide for different center heights when mounted on the tool post of a lathe machine, for example.

The following U.S. Patents are believed to exemplify the present state of the art with respect to tool bit holders: U.S. Pat. Nos. 3,603,185; 3,815,454; 4,332,513; 4,599,923; 4,640,159.

While such prior art devices provide improvement in the areas intended, there still exists a need for a tool bit holder device which overcomes the disadvantages of the prior art while providing utility features which provide new and useful advantages and improvements not heretofore disclosed.

Accordingly, a principle desirable object of the present invention is to provide a new and improved tool bit holder device which overcomes the disadvantages of the prior art devices.

Another desirable object of the present invention is to provide a new and improved tool bit holder wherein the tool holder body permits a single blade to be mounted in different positions about the holder A further desirable object of the present invention is to provide a tool bit holder shank which allows the tool bit holder to be positioned for different center heights.

A still further desirable object of the present invention is to provide a single tool bit holder which is constructed and arranged to provide various machining operations that cannot be performed by a conventional tool bit holder.

Another desirable object of the present invention is to provide a tool bit holder including the foregoing desirable objects which is simple in design, inexpensive to manufacture, rugged in construction, easy to use and efficient in operation.

SUMMARY OF THE INVENTION

The broad purpose of the present invention is to provide a variable tool bit holder which takes the place of up to eight standard tool bit holders and which can be mounted in conventional tool bit holding machines. The variable tool of the present invention for machining a workpiece includes a shank member having a generally elongated rectangular configuration in elevation including first and second opposing end surfaces, top and bottom surfaces, and left and right surfaces. A groove is positioned on an end portion of the shank member and comprises an end groove portion extending across an end surface of the shank member and side groove portions extending horizontally on the left and right side surfaces of the shank member toward the opposing end surface for a distance at least equal to the end surface groove portion. Also included is a support blade having top and bottom surfaces each defined by a frontally disposed V-shaped bit-receiving forward edge portion and a rearwardly disposed planer top surface disposed above the plane of the bit-receiving surface; a transversely projecting elongated rib extending longitudinally along the inner side of the support blade and adapted to be inserted in a selected groove portion and releasably secured thereto; an insert bit having opposing cutting tips and a V-shaped bottom edge adapted to be received in the V-shaped bit-receiving portion of the support blade; and a clamp which is releasably attachable to a portion of the surface of the shank member adjacent to the top surfaces of the bit and support blade whereby a portion of the clamp clamps the bit member between the support blade and the clamp and the top surface of the support blade.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein:

FIG. 3 is an exploded perspective view of the components in one of the side mounting arrangement of the variable tool bit holder of the present invention;

FIG. 4 is a front elevational view of the tool bit holder of FIG. 3 in the mounted position;

FIG. 5 is a side elevational view of the mounted arrangement of the tool bit holder components of FIG. 3;

FIG. 6 is a top plan view of the mounted arrangement of the tool bit holder components of FIG. 5;

FIG. 7 is an exploded perspective view of the components in one of the front mounting arrangements of the variable tool bit holder of the present invention;

FIG. 8 is a front elevational view of the tool bit holder of FIG. 7 in the mounted position;

FIG. 9 is a top plan view of the mounted arrangement of the tool bit holder components of FIG. 8;

FIG. 10 is a side elevational view illustrating an alternate embodiment of the shank member in accordance with the principles of the present invention;

FIG. 11 is a side elevational view of the tool bit holder with components mounted similar to FIG. 5 and illustrates the manner in which it can be mounted on a lathe machine and the operational features;

FIG. 12 is an inverted view of the shank member of FIG. 10 and

FIG. 13 is a side elevational view of the tool bit holder with the components mounted on the side similar to FIG. 11 but with the tool bit holder in the inverted position as shown in FIG. 12 and illustrating another mounting feature on the lathe machine

DETAILED DESCRIPTION OF PREFERRED EMBODIMENT(S)

Figures 1, 2:
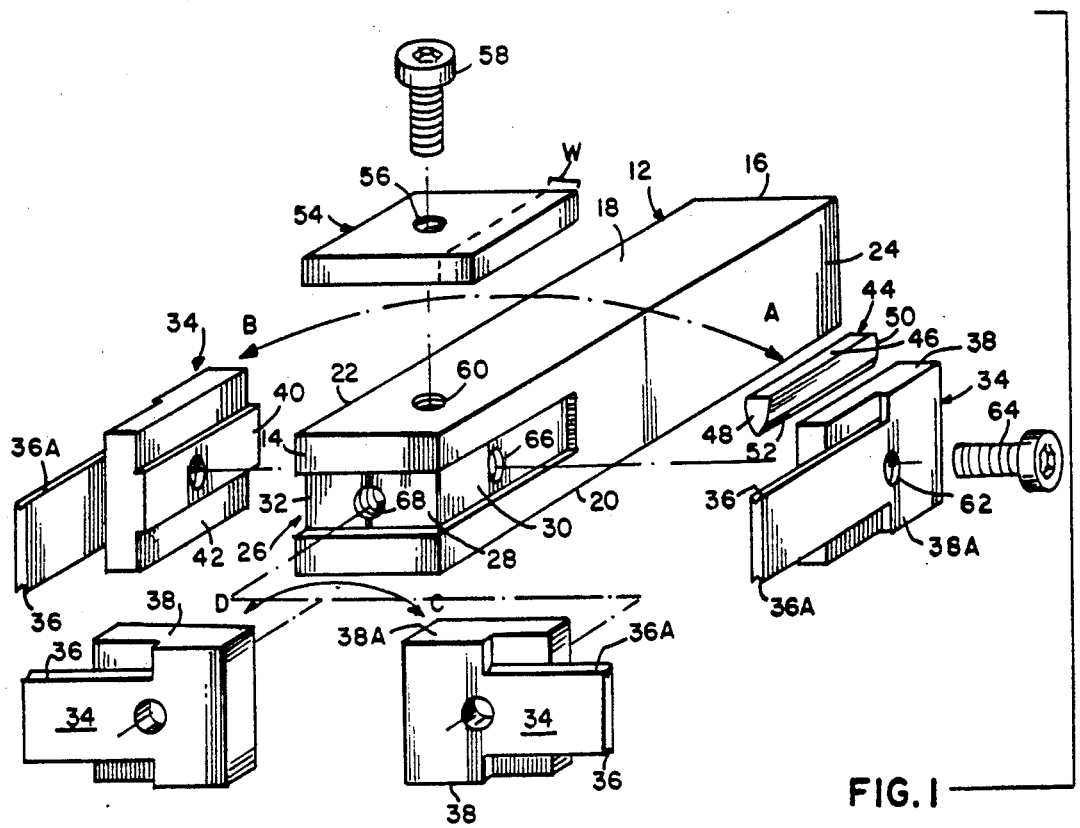
FIG. 1 is an exploded perspective view of certain principal components of the tool of the present invention and illustrating the various mounting features in accordance with the principles of the present invention.
FIG. 2 is an exploded front plan view illustrating the forward positions (C right and D left) of the support blade and bit member.

Referring now to the drawings and more particularly to FIGS. 1 and 2, there is shown certain components of the variable tool holder of the present invention to illustrate initially the cutting positions while the tool bit holder is mounted in a conventional machine such as a lathe (not shown) for machining a workpiece (not shown).

The variable tool bit holder, generally indicated by the numeral 10, includes a tool body or shank member 12 which preferably has a generally elongated rectangular configuration in elevation having a first or front end surface 14, an opposing second or rear end surface 16, top and bottom surfaces 18 and 20 and left and right side surfaces 22 and 24.

A groove, indicated generally by the numeral 26 is positioned about an end portion of the shank member 12. The groove 26 comprises an end groove portion 28 which extends across the end surface 14 of the shank member 12, a right side groove portion 30 extending horizontally along the right side 24 of the shank member 12 and a similar left side groove portion 32 extending along the left side 22 of the shank member 12.

The tool bit holder includes a support blade member 34 comprising an inner rectangular section I and an outer horizontally T-shaped section 0 in which the section 35 extends forwardly beyond the rectangular section R which together form similar top and bottom surfaces each defined by a frontally disposed V-shaped bit-receiving forward top edge portion 36 and a rearwardly disposed planar top surface 38 disposed above and partially to the inner side of the plane of the bit-receiving surface 36. The correspondingly similar bottom surfaces are respectively indicated as 36A and 38A. The support blade 34 is provided with a transversely projecting elongated rib 40 extending longitudinally and horizontally along the inner side 42 of the support blade member 34.

The insert bit 44 is preferably configured to have an elongated body 46 which terminates in opposing ends forming cutting tips 48 and 50, an upper surface 49 and a V-shaped bottom edge surface 52 adapted to be received in the V-shaped bit-receiving surfaces 36 and 36A of the support blade 34.

Referring again to FIG. 1, a clamp member 54 is provided and has a block-like configuration which is sufficiently wide as shown by the dotted line area W to extend sufficiently beyond the shank top surface 18 to form a clamping contact with the top surfaces of support blade 34 and the insert bit 44 when attached to the shank. The clamp member 54 is provided with a bore or hole 56 through which the bolt 58 is passed for threaded clamping engagement with the threaded bore 60 which extends down through the top surface 18 of the shank member 12. In a similar manner the support blade 34 is provided with a bore 62 through which bolt 64 is passed for threaded engagement with one of the selected threaded bores, such as 66, which extends from one side through to the other side of the shank member 12 or the front threaded bore 68 when the support blade 34 is to be attached to the front of the shank member 12.

With respect to the variable tool bit holder 10 of the present invention as illustrated in FIG. 1, the support blade 34 is constructed and arranged so that it can be attached to the right side 24 of the shank member 12 as indicated by the arrow A and when selected attached to the left side 22 of the shank member 12 by simply inverting the support blade 34 as shown by the arrow B position.

Similarly, the support blade 34 can be quickly and easily attached to the front or first end 14 of the shank member 12 in either a right or left position as indicated by the arrow positions C to D or D to C and as illustrated in a partially attached arrangement in FIG. 2.

Referring now more particularly to FIGS. 3–6, there is illustrated an example of the tool bit holder of the present invention which has been selected to have the support blade 34 and insert bit member 44 attached to the side 24 of the shank member 12. The support blade 34 is attached to the shank member 12 by inserting the rib member 40 into the groove 30 and inserting the bolt 64 into the bore or aperture 62 and into the threaded opening in bore 66. The bit 44 is then inserted into the V-shaped receiving forward edge portion 36 of the support blade 34. Then the clamp member 54 is attached to the top surface 18 of the shank member 12 by inserting the bolt 58 through the bore or aperture 56 into the threaded opening or bore 60. As best seen in FIG. 4, the portion W of the clamp member 54 extends sufficiently beyond the side surface 24 of the shank member 12 to secure that portion W of the clamp member 54 in contact with the top surface 49 of the bit member 44 and the top surface 38 of the support blade 34.

Referring now more particularly to FIGS. 7–9, there is illustrated another embodiment of the present invention in which the variable tool bit holder in accordance with the novel features of the present invention illustrates the selection of attaching the support blade 34 and the bit member 44 to the front left position of the shank member 12. It is believed to be readily apparent that the assembly of variable tool bit holder in this selected front position is done quickly and efficiently in the same manner as described with respect to FIGS. 3–6.

Referring now more particularly to FIG. 10, there is illustrated an alternate embodiment of the tool body shank member of the present invention referred to in FIGS. 10–13 as 12A. As shown, the shank member 12A is similar in all respects to shank member 12 as described with respect to FIGS. 1–9 hereinbefore except that it includes an enlarged end section 70 which extends upwardly from the surface 18 of the shank member 12A. In the embodiment illustrated, the non-enlarged section as shown by the arrow c of the shank member 12A is, for example, 1.000 inch and the enlarged portion as shown by the arrow b adds, for example, 0.250 inch so that the total width or height as shown by the arrow a of the enlarged section of the shank member is 1.250 inches. As shown in FIG. 11, the tool bit holder 12A of FIG. 10 when provided with the support blade member 34, insert bit member 44 and clamp member 54 components and attached to the tool post 72 of a lathe machine provides the exact center height, as shown by the arrow d, of 1.250 inches from the top surface 74 of the tool post 72 to the center line 76 of a lathe machine 78 (only partially illustrated) whereby the top of the cutting tip 48 is in the horizontal plain of the center line 76 of a lathe machine. As used in the specification and claims the term center height shall mean the distance between the surface of the shank member (18 or 20) brought into contact with the support surface 74 of the tool post and the top surface of the bit member which is equivalent to the height or distance from the support surface 74 of the machine tool post 72 and the center line 76 of the lathe machine.

Referring now more particularly to FIGS. 12 and 13, there is illustrated an alternate feature of the tool bit holder 12A of FIG. 10. As shown, when the distance as shown by arrow e between the top surface 74 of the tool post 72 and the center line 76 of the lathe machine 78 is 1.000 inch, the tool bit holder shank 12A as shown in FIG. 10 needs only to be inverted as shown in FIG. 12 and the components 34, 48 and 54 attached to the left side 22, for example, and the shank member 12A attached to the top surface 74 of the lathe machine 78 so that the enlarged end section 70 extends beyond the top surface 74 and is brought into contact with the vertical front end surface 80 of the tool post member 72. This arrangement results in lowering the upper surface portion 49 of the top of the cutting tip 48 of the bit member 44 0.250 inch so that it is in the horizontal plain of the center line 76 of the lathe machine and also one (1.000) inch above the top surface 74 of the tool post 72 as shown by the arrow e.

In summary, the variable tool bit holder of the present invention provides for machining workpieces in numerous ways without the necessity of having to have a number of tool bit holders with each one limited to perform only one function.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A tool for machining a workpiece comprising:
   a shank member having a generally elongated rectangular configuration in elevation including front and rear opposing end surfaces, top and bottom surfaces, and left and right surfaces;
   a support blade member having identical top and bottom surfaces each defined by a frontally disposed V-shaped bit-receiving forward edge portion and a rearwardly disposed planer top surface disposed above the plane of the V-shaped bit-receiving portion;
   an insert bit having opposing cutting tips and a V-shaped bottom edge adapted to be received in the V-shaped bit-receiving portion of said support blade;
   means for securing said support blade to a selected surface of said shank member whereby said insert bit extends in a selected position beyond an end portion of said shank member; and
   clamping means releasably secured to a portion of the surface of the shank member adjacent to the top surfaces of the bit member and support blade whereby a portion of the clamping means clamps said insert bit between the support blade and the clamping means and the top surface of said support blade.

2. A tool for machining a workpiece according to claim 1 wherein an elongated horizontal rib member is provided on the inner surface of said support blade member and elongated grooves provided on said selected surface of said shank member, said grooves being adapted to receive said rib member and thereby support said support blade member in a selected position with respect to the shank member.

3. A tool for machining a workpiece according to claim 2 wherein said rib member is releasably secured in a selected groove by screw means.

4. A tool for machining a workpiece according to claim 1 wherein said clamping means has a block-like configuration and is releasably mounted to said shank member by screw means.

5. A tool for machining a workpiece according to claim 1 wherein a forward portion of the top or bottom surface of the shank member is enlarged whereby the shank member provides dual center heights.

6. A tool for machining a workpiece comprising: a shank member;
   said shank member having a generally elongated rectangular configuration in elevation including front and rear opposing end surfaces, top and bottom surfaces, and left and right surfaces;
   a groove positioned on an end portion of the shank member comprising an end groove portion extending across an end surface of the shank member, side groove portions extending horizontally on the left and right side surfaces of the shank member toward the opposing end surface for a distance at least equal to the end surface groove portion;
   a support blade having top and bottom surfaces each defined by a frontally disposed V-shaped bit-receiving forward edge portion and a rearwardly disposed planer top surface disposed above the plane of the V-shaped bit-receiving portion;
   a transversely projecting elongated rib extending longitudinally along the inner side of said support blade and adapted to be inserted in a selected groove portion;
   means for securing said support blade in a selected groove portion with said rib positioned in said selected groove portion;
   an insert bit having opposing cutting tips and a V-shaped bottom edge adapted to be received in the V-shaped bit-receiving portion of said support blade;
   a clamping means; and
   means for releasably securing said clamping means to a portion of the surface of the shank member adjacent to the top surfaces of the bit member and support blade whereby a portion of the clamping means clamps said bit member between the support blade and the clamping means and the top surface of said support blade.

7. A tool for machining a workpiece according to claim 6 wherein a forward portion of the top or bottom surface of the shank member is enlarged whereby the shank member provides dual center heights.

8. A tool for machining a workpiece according to claim 6 wherein the support blade comprises an inner rectangular section and an outer horizontally T-shaped section wherein the top and bottom surfaces of the base portion of the T-shaped section are adapted to receive the bottom surface of an insert bit member and the top and bottom surfaces of the end portion of the T-shaped section each form horizontal planer surfaces at a height equal to the top surface of the insert bit member.

9. A tool for machining a workpiece comprising:

a shank member having a generally elongated rectangular configuration in elevation including forward and rearward end surfaces, top and bottom surfaces, and left and right surfaces, with the forward portion of the top or bottom surface of the shank member being enlarged to thereby provide dual center heights;

a groove positioned on an end portion of the shank member comprising an end groove portion extending across an end surface of the shank member, side groove portions extending horizontally on the left and right side surfaces of the shank member toward the opposing end surface for a distance at least equal to the end surface groove portion;

a first transverse bore extending through the shank member between the right groove and the left groove;

a second transverse bore extending through the shank member between the top surface and the bottom surface within the forward portion of the shank member defined by the side grooves;

a third bore extending horizontally through a portion of the shank member from the end groove of the end surface;

a support blade having top and bottom surfaces each defined by a frontally disposed V-shaped bit-receiving forward edge portion and a rearwardly disposed planer top surface disposed above the plane of the bit-receiving portion;

a transversely projecting elongated rib extending longitudinally along the inner side of said support blade and adapted to be inserted in a selected groove portion;

means for securing said support blade in a selected groove portion with said rib positioned in said selected groove portion;

an insert bit having opposing cutting tips and a V-shaped bottom edge adapted to be received in the V-shaped bit-receiving portion of said support blade;

a clamping means; and means for releasably securing said clamping means to a portion of the surface of the shank member adjacent to the top surfaces of the bit member and support blade whereby a portion of the clamping means clamps said bit member between the support blade and the clamping means and the top surface of said support blade.

* * * * *